(12) United States Patent
Goldburt

(10) Patent No.: US 9,216,844 B2
(45) Date of Patent: Dec. 22, 2015

(54) CONTAINER FOR BEVERAGES

(75) Inventor: Tim Goldburt, New York, NY (US)

(73) Assignee: Medea Inc., Pleasanton, CA (US)

( * ) Notice: Subject to any disclaimer, the term of this patent is extended or adjusted under 35 U.S.C. 154(b) by 98 days.

(21) Appl. No.: 13/486,076

(22) Filed: Jun. 1, 2012

(65) Prior Publication Data

US 2013/0319892 A1    Dec. 5, 2013

(51) Int. Cl.
*B65D 23/12* (2006.01)

(52) U.S. Cl.
CPC ............ *B65D 23/12* (2013.01); *B65D 2203/12* (2013.01)

(58) Field of Classification Search
CPC ........... B65D 23/12; A45C 11/38; H04N 7/14
USPC .......... 777/216, 701; 352/37; 206/578, 316.1, 206/316.2, 216, 701, 459.1; 215/383, 386; 40/310; 396/322, 323, 429, 430; 353/71, 48, 82; 220/710; 345/1.1
See application file for complete search history.

(56) References Cited

U.S. PATENT DOCUMENTS

| | | |
|---|---|---|
| 97,669 A | 12/1869 | Millen |
| D20,656 S | 3/1891 | Dawes |
| D23,100 S | 3/1894 | Fay et al. |
| 716,793 A | 12/1902 | Vogeler |
| 823,008 A | 6/1906 | Vendig |
| 1,262,788 A | 4/1918 | Heidenreich |
| 1,554,191 A | 9/1925 | Alexander |
| 1,653,608 A | 3/1927 | Allen |
| 1,686,354 A | 3/1927 | Wallace |
| 1,769,147 A | 12/1927 | Benjamin |
| 1,856,550 A | 12/1928 | Guenard |
| 1,770,093 A | 2/1929 | West |
| D79,958 S | 11/1929 | De Wagner |
| D85,487 S | 7/1931 | Meyer |
| 3,864,976 A | 2/1975 | Parker |
| 3,965,590 A | 6/1976 | Algaze |
| 3,996,879 A | 12/1976 | Walton |
| 4,607,756 A | 8/1986 | Courtman |
| D285,903 S | 9/1986 | Courtman |
| 4,765,465 A | 8/1988 | Yamada et al. |
| 4,928,412 A | 5/1990 | Nishiyama |
| D314,308 S | 2/1991 | Cogswell |
| D317,123 S | 5/1991 | Colani |
| D318,224 S | 7/1991 | Altobelli |
| 5,125,866 A | 6/1992 | Arad et al. |
| 5,168,646 A | 12/1992 | Dippong et al. |
| 5,201,431 A | 4/1993 | Berger et al. |
| 5,211,699 A | 5/1993 | Tipton |

(Continued)

FOREIGN PATENT DOCUMENTS

| | | |
|---|---|---|
| JP | 07-027624 | 1/1995 |
| WO | WO 03/099039 | 12/2003 |
| WO | WO 2010/138107 | 12/2010 |

OTHER PUBLICATIONS

Tech-Recipes, http://www.tech-recipes.com/rx/2484/iphone_change_the_auto_lock_delay/, Jun. 29, 2007.

*Primary Examiner* — Luan K Bui
*Assistant Examiner* — Rafael Ortiz
(74) *Attorney, Agent, or Firm* — Lowenstein Sandler LLP

(57) ABSTRACT

A container for alcoholic or non alcoholic beverages has a container body for accommodating a beverage, and a camera attached to the container body, for making pictures, as well as for storing, printing, and projecting the pictures.

10 Claims, 2 Drawing Sheets

(56) References Cited

U.S. PATENT DOCUMENTS

| | | |
|---|---|---|
| 5,297,247 A | 3/1994 | Kan |
| 5,339,548 A | 8/1994 | Russell |
| 5,347,453 A | 9/1994 | Maestre |
| 5,379,916 A | 1/1995 | Martindale et al. |
| 5,553,735 A | 9/1996 | Kimura |
| 5,575,553 A | 11/1996 | Tipton |
| 5,678,925 A | 10/1997 | Garmaise et al. |
| 5,774,876 A | 6/1998 | Woolley et al. |
| 5,823,346 A | 10/1998 | Weiner |
| 5,863,752 A | 1/1999 | Court et al. |
| 5,884,421 A | 3/1999 | Key |
| 5,992,678 A | 11/1999 | Willey |
| 6,037,872 A | 3/2000 | Dunnum |
| 6,062,380 A | 5/2000 | Dorney |
| 6,084,526 A | 7/2000 | Blotky et al. |
| 6,158,870 A | 12/2000 | Ramirez |
| D436,852 S | 1/2001 | Chan |
| 6,213,616 B1 | 4/2001 | Chien |
| 6,302,608 B1 | 10/2001 | Holmes et al. |
| 6,393,401 B1 | 5/2002 | Loudermilk et al. |
| D470,770 S | 2/2003 | Machado et al. |
| 6,527,402 B1 | 3/2003 | Borri |
| D473,469 S | 4/2003 | Claessen |
| 6,588,131 B2 | 7/2003 | O'Connell, Jr. |
| 6,588,593 B2 | 7/2003 | Woskoski |
| 6,747,918 B2 | 6/2004 | Hight et al. |
| 6,762,734 B2 | 7/2004 | Blotky et al. |
| 6,872,116 B1 | 3/2005 | Dunnum et al. |
| 6,923,549 B2 | 8/2005 | Hoy |
| 6,945,418 B2 | 9/2005 | Guido et al. |
| 7,000,343 B1 | 2/2006 | Teichman |
| D521,388 S | 5/2006 | Andoh |
| D521,389 S | 5/2006 | Andoh |
| D522,865 S | 6/2006 | Andoh |
| D523,346 S | 6/2006 | Andoh |
| 7,152,832 B2 | 12/2006 | Wochnick |
| 7,163,311 B2 | 1/2007 | Kramer |
| 7,300,171 B2 | 11/2007 | Sutton |
| D571,153 S | 6/2008 | Lopez |
| 7,383,650 B2 | 6/2008 | Duesler |
| D574,249 S | 8/2008 | Seum et al. |
| D575,583 S | 8/2008 | Morgan |
| 7,413,082 B2 | 8/2008 | Adler et al. |
| D596,037 S | 7/2009 | Slubski |
| 7,690,533 B2 | 4/2010 | Stilley |
| D617,200 S | 6/2010 | Goldburt |
| 7,824,051 B2 | 11/2010 | Walter et al. |
| 7,837,333 B2 * | 11/2010 | Chou et al. ........................ 353/48 |
| 7,934,845 B2 | 5/2011 | Yang |
| 7,954,970 B2 | 6/2011 | Goldburt |
| 8,056,273 B2 | 11/2011 | Goldburt |
| 8,123,033 B2 | 2/2012 | Goldburt |
| 8,232,981 B2 | 7/2012 | Sandy |
| 2002/0097195 A1 | 7/2002 | Frank |
| 2002/0104848 A1 | 8/2002 | Burrows et al. |
| 2002/0126150 A1 * | 9/2002 | Parry ........................... 345/771 |
| 2002/0190869 A1 | 12/2002 | Blotky et al. |
| 2003/0076672 A1 | 4/2003 | Head |
| 2003/0099158 A1 | 5/2003 | De la Huerga |
| 2003/0122730 A1 | 7/2003 | Frank et al. |
| 2003/0129283 A1 | 7/2003 | Martinez Carballido |
| 2003/0226298 A1 | 12/2003 | Bjork |
| 2004/0004829 A1 | 1/2004 | Policappelli |
| 2004/0026357 A1 | 2/2004 | Beck et al. |
| 2004/0118022 A1 | 6/2004 | Duesler |
| 2004/0140286 A1 | 7/2004 | Zoller |
| 2004/0148117 A1 | 7/2004 | Kirshenbaum et al. |
| 2004/0206828 A1 | 10/2004 | Harris |
| 2005/0024858 A1 | 2/2005 | Johnson |
| 2005/0036301 A1 | 2/2005 | Haines |
| 2005/0134461 A1 | 6/2005 | Gelbman et al. |
| 2005/0152392 A1 | 7/2005 | Lim et al. |
| 2005/0161558 A1 | 7/2005 | Stahl et al. |
| 2005/0193612 A1 | 9/2005 | Lowry |
| 2005/0205437 A1 | 9/2005 | Huffman |
| 2005/0207141 A1 | 9/2005 | Boesch et al. |
| 2005/0229449 A1 | 10/2005 | Shepley |
| 2005/0270396 A1 * | 12/2005 | Miyashita et al. ....... 348/333.01 |
| 2006/0087831 A1 | 4/2006 | Kramer |
| 2006/0118507 A1 | 6/2006 | Feldman |
| 2006/0139928 A1 | 6/2006 | Griffiths et al. |
| 2006/0202042 A1 | 9/2006 | Chu |
| 2006/0231109 A1 | 10/2006 | Howell et al. |
| 2007/0024465 A1 | 2/2007 | Howell et al. |
| 2007/0069883 A1 | 3/2007 | Collier et al. |
| 2007/0091123 A1 | 4/2007 | Akashi |
| 2007/0158293 A1 | 7/2007 | Andreani |
| 2007/0299778 A1 | 12/2007 | Haveson et al. |
| 2008/0023357 A1 * | 1/2008 | Whiteis ........................ 206/316.1 |
| 2008/0034628 A1 | 2/2008 | Schnuckle |
| 2008/0074625 A1 * | 3/2008 | Lai et al. ........................ 353/82 |
| 2008/0100469 A1 | 5/2008 | Goldburt |
| 2008/0128300 A1 | 6/2008 | Bahar et al. |
| 2008/0149589 A1 * | 6/2008 | Lach ........................ 215/386 |
| 2008/0264816 A1 * | 10/2008 | Yeh ........................ 206/316.2 |
| 2008/0296191 A1 | 12/2008 | Ransch |
| 2008/0314861 A1 * | 12/2008 | Goldburt ........................ 215/366 |
| 2008/0317906 A1 | 12/2008 | Goldburt |
| 2008/0319876 A1 | 12/2008 | Goldburt |
| 2009/0293328 A1 | 12/2009 | Bull |
| 2010/0101124 A1 | 4/2010 | Sorensen |
| 2010/0182518 A1 | 7/2010 | Kirmse et al. |
| 2010/0300913 A1 * | 12/2010 | Goldburt ........................ 206/459.1 |
| 2010/0300914 A1 | 12/2010 | Goldburt et al. |
| 2011/0100852 A1 * | 5/2011 | Goldburt ........................ 206/459.5 |
| 2011/0100853 A1 | 5/2011 | Goldburt |
| 2011/0122120 A1 | 5/2011 | Feuilloley |
| 2011/0155604 A1 | 6/2011 | Goldburt |
| 2011/0303579 A1 * | 12/2011 | Sanders ........................ 206/701 |
| 2012/0171963 A1 | 7/2012 | Tsfaty |
| 2012/0239470 A1 | 9/2012 | Goldburt |
| 2012/0273372 A1 | 11/2012 | Goldburt et al. |
| 2014/0094126 A1 | 4/2014 | Sandy |

* cited by examiner

CONTAINER FOR BEVERAGES

BACKGROUND OF THE INVENTION

The present invention relates generally to containers, in particular to containers for alcoholic and non-alcoholic beverages.

Containers of the above mentioned general type are know in the art, and manufactured and used in great varieties. The containers are usually provided with labels. Also containers are known, which are provided with electronic devices of various types. It is believed that the existing containers for alcoholic and non-alcoholic beverages can be further improved.

SUMMARY OF THE INVENTION

Accordingly, it is an object of the present invention to provide a container for beverages, which is a further improvement of the existing containers for beverages.

In keeping with these objects and with others which will become apparent hereinafter, one feature of the present invention resides, briefly stated, in a beverage container comprising a hollow container body for accommodating a beverage, and a camera attached to said container body of the beverage container and configured to make pictures.

In accordance with another feature of the present invention, means are provided for projecting the pictures made by the camera onto an electronic display provided in the container body, or into an interior of the container body, or onto an outside surface, or various combinations of the above are possible.

In accordance with the present invention, the camera makes pictures of still images or moving images, and the projecting means project the still images, or the moving images, or both onto corresponding objects. In accordance with a further feature of the present invention, the pictures produced by the camera can also be stored, or stored and reproduced later, or wirelessly transmitted to recipients, or printed, or combinations of the above are possible as well.

In accordance with another feature of the present invention, means can be provided for recording audio messages during making pictures or independently from them, and reproducing of the recorded audio messages or transmitting the latter.

In accordance with another feature of the present invention, the camera can be introduced into a cavity of the container body together with another electronic device or separately from the electronic device.

The novel features of the present invention are set forth in particular in the appended claims. The invention itself, however, both as to its construction and its method of operation, will be best understood from the following description of the preferred embodiments, which is accompanied by the following drawings.

DESCRIPTION OF THE PREFERRED EMBODIMENTS

Figure 1:
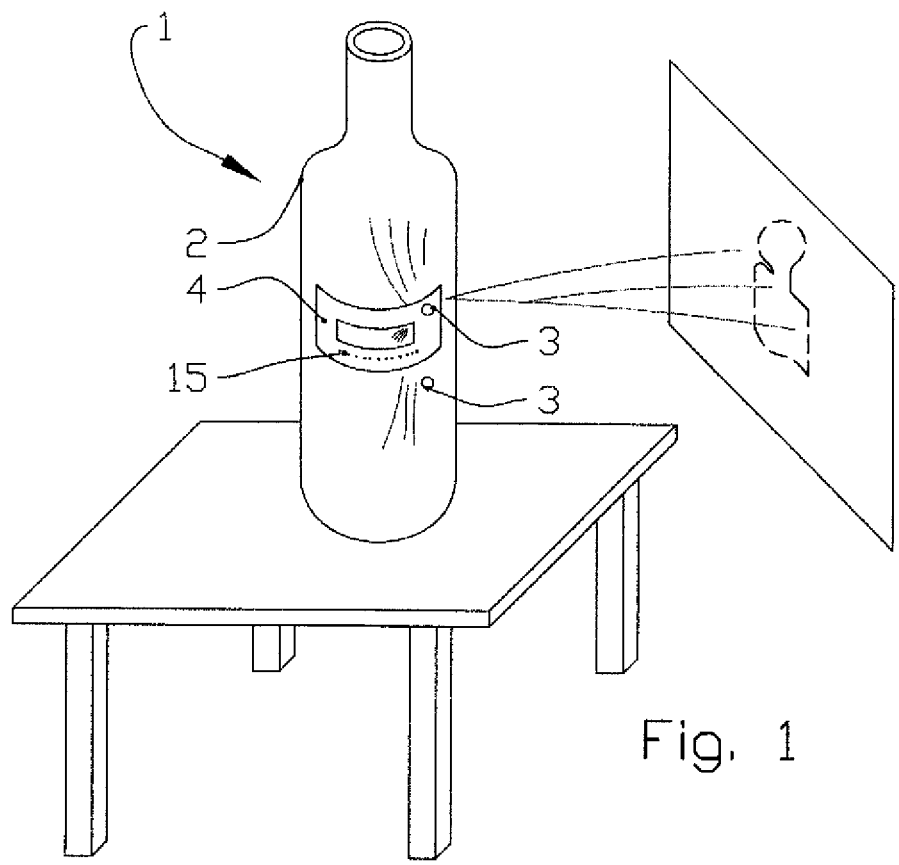
FIG. 1 of the drawings is a perspective view showing a container for beverages in accordance with the present invention.

In accordance with the present invention, a beverage container is provided for accommodating an alcoholic or a non-alcoholic beverage as identified with reference numeral 1. The beverage container 1 has a container wall 2 which delimits a hollow interior accommodating the beverage.

Figure 2:
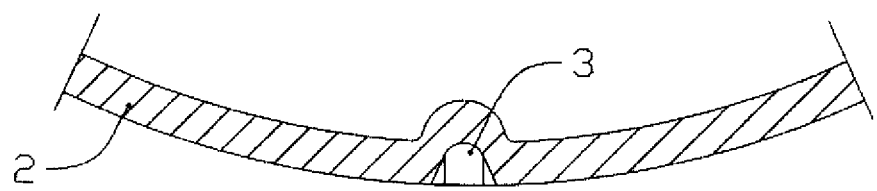
FIG. 2 is a view showing a partial cross section of a wall of the beverage container in accordance with one embodiment of the present invention.

The beverage container 1 is provided with a camera 3 for taking pictures. The camera 3 can be formed as an electronic camera. It can be for example introduced directly into a cavity formed in the container wall 2 by a snap action and retained in it, as shown in FIG. 2, and used for taking picture while being on the beverage container 1. The camera 3 can be also removed from the cavity of the container wall by simply pulling it out, and thereafter used outside of and without the beverage container 1, as will be explained hereinafter.

Figure 3:
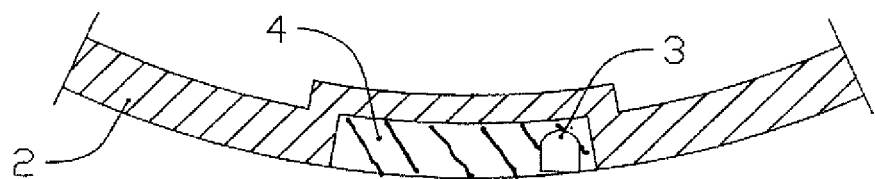
FIG. 3 is a view showing a partial cross section of a wall of the beverage container in accordance with another embodiment of the present invention.
Figure 4:
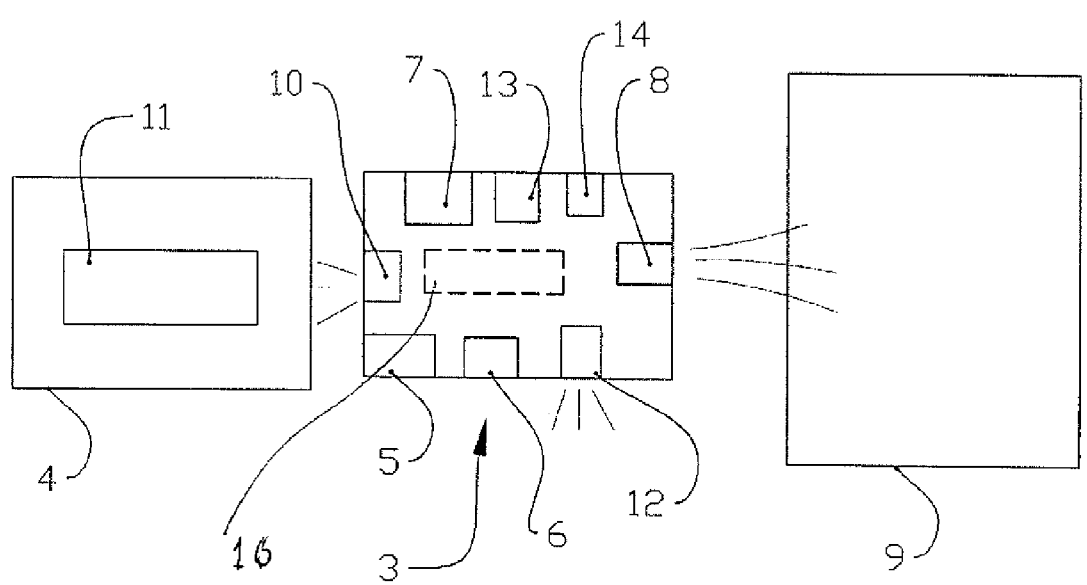
FIG. 4 is a view showing a schematic diagram of an electronic circuit of the inventive beverage container.

The camera 3, on the other hand, can be incorporated into an electronic device 4, which, together with the camera 3, can be introduced into a cavity of the container wall for example by snap action and held in it, as shown in FIG. 3. The electronic device 4 can be also removed from the cavity of the container wall together with the camera 3, so that the electronic device 4 with the camera 3, or the camera 3 and the electronic device 4 separately, can be used outside of the beverage container 1.

The camera 3 can be formed and operate as a camera which produces pictures of still images, such as a photo camera, or pictures of moving images, such as a movie camera, as known per se in the art of cameras. When it is located on the beverage container 1 it can make pictures of a person or an object in front of the beverage container or at any location by simply turning the beverage container 1 with the camera 3 in a corresponding direction and activating the camera. The same can be also done when the camera 3 or the electronic device 4 with the camera 3 are removed from the beverage container 1 and used separately.

The camera 3 can store the pictures which it makes, of the still images or the moving images, in its memory 5. The camera 3 further has output means 6 for outputting the pictures made by it in order to print the pictures. The camera 3 further has output means 7 for wirelessly transmitting the picture made by it, for example via internet.

The camera 3 is further provided with projecting means for projecting the pictures made by it, including still or moving images. The projecting means include a projecting unit 8 which projects the images onto an outside screen 9, a projecting unit 10 which projects the images onto a display 11 of the electronic device 4, a projecting unit 12 which projects the images into the interior of the beverage container 1 into its hollow space which can be filled with a beverage, onto the electronic device 4 etc.

The camera 3 and/or the electronic device 4 can be further provided with audio recording means 13 which can record audio messages. The recorded audio messages can accompany or they do not accompany the images produced by the camera 3. The recorded audio messages also can have an audio content that corresponds to or does not correspond to the content of the images produced by the camera 3. The camera also has audio messages reproducing means 14, which reproduce the audio recorded audio messages. The audio recording means and the audio reproducing means can be combined with one another.

The camera 3 and/or the electronic device 4 further has control means 15 which control all operations of the camera 3, such as taking pictures, printing the pictures, transmitting the pictures wirelessly or via wires, projecting the picture in different directions, recording audio messages, reproducing audio messages, etc. The control means 15 can be formed as a plurality of operation-specific buttons, as a keyboard, etc.

A microprocessor 16 is further provided in the beverage container. It is designed and operates to perform all required functions of the electronic components disclosed hereinabove.

The electronic device 4 of the container for beverages 1 can be formed and performs the functions as disclosed, for example, in patent application Ser. Nos. 11/588,494, 11/821,334, and 11/821,349, which are incorporated by reference herein.

The invention is not limited to the details shown since various modifications and structural changes are possible without departing from the spirit of the present invention.

What is claimed as new and desired to be protected by Letters Patent is set forth in the appended claims.

The invention claimed is:

1. A beverage container comprising:
   a hollow container body for accommodating a beverage;
   a first cavity in an exterior wall of the hollow container body, the first cavity having contours;
   a camera, attached to the exterior wall of said hollow container body in the first cavity, to generate pictures of objects external to the beverage container, wherein the camera has a shape that conforms to the first contours of the first cavity;
   a second cavity in the exterior wall of the hollow container body, the second cavity being larger than the first cavity;
   a first projector, attached to the exterior wall of said hollow container body in the second cavity, to project the pictures generated by the camera onto a surface of a remote object external to the beverage container; and
   a second projector, attached to the exterior wall of said hollow container body in the second cavity, to project the pictures generated by the camera through a liquid contained by the hollow container body and onto an interior wall of the hollow container body.

2. The beverage container as defined in claim 1, wherein the pictures generated by the camera comprise at least one of still images or moving images.

3. The beverage container as defined in claim 1, further comprising:
   a memory to store the pictures generated by the camera.

4. The beverage container as defined in claim 1, further comprising:
   an audio recorder to record audio messages during generation of the pictures or independently from the generation of the pictures; and
   a speaker to output the recorded audio messages.

5. The beverage container as defined in claim 1, wherein said camera is insertable into and removable from the first cavity.

6. The beverage container as defined in claim 5, further comprising:
   an electronic device comprising a display, a memory, a processor, the first projector and the second projector, wherein the electronic device is introducible into the second cavity.

7. The beverage container as defined in claim 1, further comprising:
   a display, attached to said exterior wall of the hollow container body in the second cavity, to display the pictures generated by the camera.

8. The beverage container as defined in claim 3, further comprising:
   a processor to access one or more of the pictures generated by the camera from the memory and to display the one or more pictures on a display attached to said container body.

9. The beverage container as defined in claim 1, further comprising:
   a wireless network adapter to transmit the pictures generated by the camera to one or more recipients.

10. The beverage container as defined in claim 1, wherein the hollow container body comprises a rigid body.

* * * * *